United States Patent [19]
Watanabe et al.

[11] Patent Number: 5,105,864
[45] Date of Patent: Apr. 21, 1992

[54] PNEUMATIC TIRE

[75] Inventors: Susumu Watanabe; Kiyoshi Tomioka, both of Hiratsuka, Japan

[73] Assignee: The Yokohama Rubber Co., Ltd., Tokyo, Japan

[21] Appl. No.: 564,245

[22] Filed: Aug. 8, 1990

[30] Foreign Application Priority Data

Aug. 25, 1989 [JP] Japan .................................. 1-217281

[51] Int. Cl.$^5$ ............................................. B60C 11/06
[52] U.S. Cl. ................................ 152/209 R; D12/147
[58] Field of Search ....... 152/209 R, 209 D, 209 WT, 152/209 NT, 209 A

[56] References Cited

U.S. PATENT DOCUMENTS

| D. 190,985 | 7/1961 | Blankenship | 152/209 D |
|---|---|---|---|
| 4,057,089 | 11/1977 | Johannsen | 152/209 R |
| 4,962,801 | 10/1990 | Tsuda | 152/209 R |

*Primary Examiner*—Michael W. Ball
*Assistant Examiner*—Nancy T. Krawczyk
*Attorney, Agent, or Firm*—Armstrong, Nikaido, Marmelstein, Kubovcik & Murray

[57] ABSTRACT

This invention relates to a pneumatic tire equipped on its tire tread surface with a plurality of main grooves extending in a tire circumferential direction and transverse grooves extending from the center portion to shoulder portions while crossing the main grooves. The radius r of an approximate arc approximating to the ground contact front edge line of the tire tread surface has a relation $r \leq 2w$ with the ground contact width w, the direction of the main grooves has an angle within a range of $\pm 10°$ with respect to the normal of the approximate arc and the main grooves are disposed also in the shoulder portions outside 40 % from the center of the tire tread surface besides the center portion.

3 Claims, 1 Drawing Sheet

PNEUMATIC TIRE

BACKGROUND OF THE INVENTION

This invention relates to a pneumatic tire. More particularly, the present invention relates to a pneumatic tire having improved drainability of the tire.

To improve drainability of pneumatic tires in general, it has been believed better conventionally to dispose a straight groove at the center portion of a tread pattern in a circumferential direction and transverse grooves (lug grooves) in shoulder portions.

To further improve drainability, a directional pattern wherein the transverse grooves are disposed in a V-shaped throughout the ground contact width of the tire has been employed.

However, the improvement in drainability has not been entirely satisfactory even when various grooves or directional patterns described above are employed.

SUMMARY OF THE INVENTION

It is an object of the present invention to provide a pneumatic tire having an improved drainability, more particularly a pneumatic tire having an improved wet performance such as a hydroplaning occurrence speed and a wet circle turning limit speed.

In a pneumatic tire equipped on the tire tread surface thereof with a plurality of main grooves extending in the tire circumferential direction and transverse grooves extending from the center portion to the shoulder portions while crossing the main grooves, the present invention provides a pneumatic tire characterized in that the radius r of the approximate arc of the ground contact front edge line, which is defined by an arc containing a point of intersection a between the center line extending through the ground contact width center of the tire tread surface in the tire circumferential direction and the ground contact front edge line, and points of intersection b and c at which lines extending in the tire circumferential direction through positions spaced apart by the distance of 40% of the ground contact width w on the right and left from the center line, respectively, cross the ground contact front edge line, has a relation $r \leq 2w$ with the ground contact width w, the direction of the main grooves connecting the adjacent transverse grooves is at an angle within a range of $\pm 10°$ with respect to the normal of the approximate arc, and the main grooves are also disposed in the shoulder portions outside the zone of 40% of the ground contact width w from the tire tread surface center, inclusive of the center portion.

Here, the term "ground contact front edge line" of the tire means the boundary between the front edge portion of the ground contact surface and the non-contact surface on the ground contact surface of the tire tread surface in the travelling direction of a vehicle when a normal load stipulated by JATMA is applied to the pneumatic tire.

The term "arc approximate to the ground contact front edge line of the tire tread surface" means an arc which contains a point of intersection between the center line extending in the tire circumferential direction through the center of the ground contact width of the tire tread surface and the ground front edge line, and points of intersections at which lines extending in the tire circumferential directions through positions spaced apart by 40% of the ground contact width on the right and left sides from the center line cross the ground contact front edge line, respectively.

As a result of observation, the draining direction of water pushed aside by the ground contact front edge of the tire surface, when the tires fitted to a vehicle run on a wet road surface, is found to be substantially in agreement with the direction of the normal of the ground contact front edge line. The present invention sets the shape of the ground contact front edge line of the tire tread surface to the shape capable of efficiently discharging water and sets also the directions of the grooves which make a great contribution to the draining operation on the basis of the finding described above.

In the present invention, the ground contact front edge line of the tire tread surface must be set so that the radius r of the approximate arc defined above has the relation $r \leq 2w$ with the ground contact width w. In other words, the ground contact front edge line of the present tire is preferably as round as possible and the higher draining effect at the ground contact front edge can be obtained in such a case. If it is greater than 2w, however, the ground contact surface becomes close to a square. Such a square ground contact surface has a lower draining effect at the front edge than the ground contact surface which is close to the round surface.

In the present invention, the direction of disposition of each main groove connecting the adjacent transverse grooves must be within a range of $\pm 10°$ with respect to the normal of the approximate arc. This arrangement minimizes the flow resistance when water is discharged from the grooves at the ground contact front edge of the tire tread surface and drainage can be effected most efficiently.

The main grooves satisfying the requirements for the disposition and angle described above exist in the entire tread surface zone inclusive of the center portion and must be disposed in shoulder portions outside 40% of the ground contact width from the center of the tire tread surface, too. This arrangement makes it possible to make efficient drainage throughout the entire zone of the ground contact front edge of the tire tread surface. This improvement in drainability increases the running speed till hydroplaning occurs and improves the wet circle turning limit speed. Thus, maneuvering stability on the wet tread surface can be improved.

DESCRIPTION OF THE PREFERRED EMBODIMENTS

Hereinafter, a preferred embodiment of the present invention will be explained with reference to the accompanying drawings.

Figure 1:
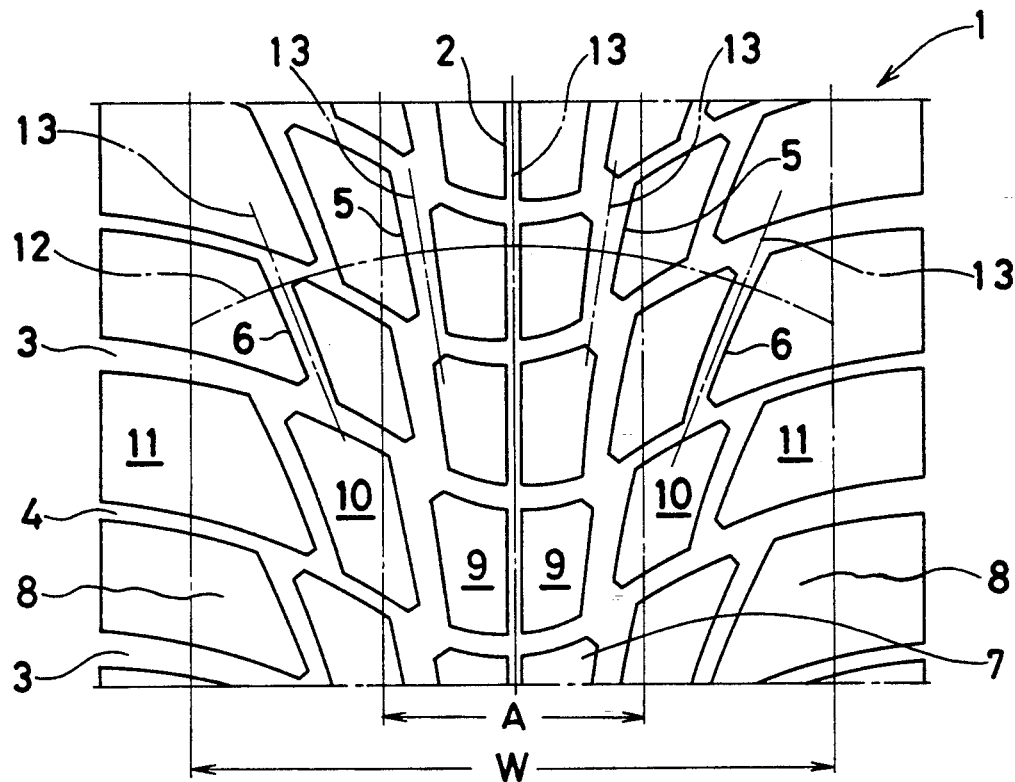
FIG. 1 is a tread pattern exploded view of a pneumatic tire in accordance with the present invention.

FIG. 1 is a tread pattern exploded view of the pneumatic tire in accordance with the present invention. A linear first main groove 2 is shown disposed at the center of a tread 1 in such a manner as to extend in a tire circumferential direction.

Two kinds of herringbone transverse grooves 3 and 4 having mutually different groove width shapes are alternately disposed in pairs in the tire circumferential direction in such a manner as to cross transversely the main groove 2.

Furthermore, second and third main grooves 5, 6 communicating with the transverse grooves 3, 4 are disposed on both sides of the first main groove 2. These two kinds of main grooves 5, 6 exhibit the zigzag shape through part of the transverse grooves 3, 4. Since the main groove 2 crosses the transverse grooves 3, 4 and the main grooves 5, 6 communicate with the transverse grooves 3, 4, a block group consisting of blocks 9, 10, 11 is defined from a tread center portion 7 to each shoulder portion 8. Each transverse groove 3 has a width which decreases progressively from the left end of the tread 1 to the right end while each transverse groove 4 has a width which decreases progressively from the right end of the tread 1 to the left end, on the contrary.

Needless to say, the main groove 2 described above is disposed in the direction of the normal 13 of a later-appearing approximate arc 12 but the main grooves 5, 6 are disposed in the direction of the normal 13 of the approximate arc 12 in the zones connecting to the transverse grooves 3, 4, as well. Such a groove disposition in the direction of the normal minimizes the flow resistance when the tire treads the film-like water surface and water is discharged from the main grooves 2, 5, 6 at the ground contact front edge 16 of the tire tread surface 14.

Figure 2:
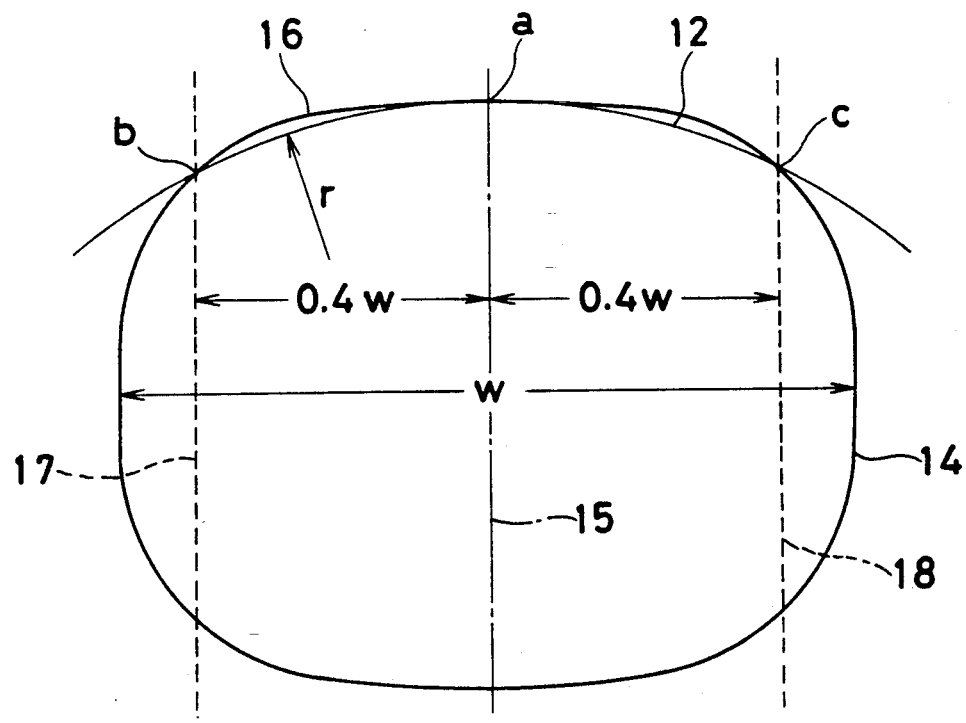
FIG. 2 is an explanatory view of an approximate arc which is approximate to a ground contact front edge line of the tire.

As shown in FIG. 2, the approximate arc 12 is defined by an arc containing a point of intersection a between the center line of the tire tread surface 14 extending in the tire circumferential direction while passing through the center of the ground contact width and the ground contact front edge line 16 of the tire tread surface 14 and two points of intersection b, c which are spaced apart by the distance of 40% of the ground contact width w to the right and left from the center line 15 described above, respectively, and at which two lines 17, 18 extending in the tire circumferential direction cross the ground contact front edge line 16, respectively. The radius r of this approximate arc 12 has the relation $r \leq 2w$ with the ground contact width w described above.

Each third main groove 6 is disposed in the shoulder portion 8 outside the tread center portion 7 having a width A of 40% of the tire ground contact width w so as to discharge efficiently water from the region of the shoulder portion 8. The main groove 2 is disposed at the center of the tread 1 and the second main groove 5, too, is disposed inside the tread center portion 7 described above.

When the tires having the tread pattern described above are fitted to a passenger car and run on a wet road surface, film-like water covering the road surface is pushed aside substantially uniformly and most efficiently in the direction of the normal 13 throughout the approximate arc 12 which is approximate to the ground contact front edge line 16 of the tire.

Accordingly, since drainability of the tire can thus be improved, various performance such as a hydroplaning occurrence speed and a wet circle turning limit speed can be by far improved in comparison with conventional tires.

Table below shows the result of comparative evaluation of the hydroplaning occurrence speed and the wet circle turning limit speed in the actual cars to which the tires of the present invention, the conventional tires and comparative tires are fitted, respectively.

|  | Conventional Tire | Comparative Tire | Tire of this Invention |
|---|---|---|---|
| groove area ratio (%) | 34 | 34 | 34 |
| hydroplaning occurrence speed (index) | 100 | 97 | 108 |
| wet circle turning limit speed (index) | 100 | 98 | 103 |

It can be understood from Table above that the tire of this invention is more excellent in the hydroplaning occurrence speed and the wet circle turning limit speed than the conventional tire and the comparative tire.

The tires used for the evaluation are as follows.

(a) Tire of This invention

A tire equipped with three main grooves 2, 5, 6 facing the direction of the normal 13 of the approximate arc 12 approximate to the ground contact front edge line 16 of the tire tread surface, as shown in FIG. 1.

(b) Conventional Tire

A tire equipped with the second and third main grooves 5, 6 which are straight grooves parallel to the first main groove 2.

(c) Comparative Tire

A tire whose second and third main grooves 5, 6 are inclined by 15° to the shoulder portion side with respect to the normal 13 of the approximate arc 12 approximate to the ground contact front edge line 16.

As described above, in a pneumatic tire equipped on the tire tread surface with a plurality of main grooves extending in the tire circumferential direction and transverse grooves extending from the center portion to the shoulder portions while crossing the main grooves, the present invention provides the pneumatic tire characterized in that the radius r of the approximate arc of the ground contact front edge line, which is defined by an arc containing a point of intersection a between the center line extending through the ground contact width center of the tire tread surface in the tire circumferential direction and the ground contact front edge line, and the points of intersection b, c at which the lines extending in the tire circumferential direction through the positions spaced apart by the distance of 40% of the ground contact width w on the right and left from the center line, respectively, cross the ground contact front edge line, has the relation $r \leq 2w$ with the ground contact width w, the direction of the main groove connecting the adjacent transverse grooves is at an angle within a range of ±10° with respect to the normal of the approximate arc, and the main grooves are disposed also in the shoulder portions outside the zone of 40% of the ground contact width w from the tire tread surface center, inclusive of the center portion. Accordingly, drainability of the tire can be by far improved in comparison with the conventional tires and for this reason, various performance such as the hydroplaning occurrence speed and the wet circle turning limit speed can be improved, too.

What is claimed is:

1. A pneumatic tire having a tread surface including a plurality of main grooves extending in a circumferential direction of the tire and transverse grooves crossing said main grooves, said transverse grooves disposed in a V-shape and continuously extending across the tread surface, wherein the improvement comprises: a radius r of an approximate arc of a ground contact front edge line of the tread surface, which is defined by said arc intersecting a center line extending through the ground contact width center of the tire tread surface in the tire circumferential direction at a point a where said center line and the ground contact front edge line intersect, and intersecting lines extending in the tire circumferential direction and spaced on each of the right and left sides of the center line by a distance of 40% of the ground contact width w, at points b and c where said intersecting lines cross the ground contact front edge line, has the relation r≦2w with the ground contact width w, the direction of said main grooves connecting said transverse grooves is at an angle within a range of ±10° with respect to a normal of the approximate arc, certain ones of said main grooves are disposed also in shoulder portions of said tread surface outside a zone of 40% of the ground contact width w of the tire tread surface, said zone being symmetrical with said center line, and a plurality of said transverse grooves having a groove width that decreases progressively from the left end to the right end of said tread surface and a plurality of said transverse grooves having a groove width that decreases progressively from the right end to the left end of said tread surface are alternately disposed in the tire circumferential direction.

2. A pneumatic tire according to claim 1, wherein said transverse grooves are curved in a herringbone form.

3. A pneumatic tire according to claim 1, wherein one of said main grooves is a straight groove at a center portion of said tread and other ones of said main grooves are disposed in a zig zag pattern in regions other than said tread center portion.

* * * * *